United States Patent
Mironov et al.

(10) Patent No.: US 12,148,120 B2
(45) Date of Patent: Nov. 19, 2024

(54) FRAME REPROJECTION FOR VIRTUAL REALITY AND AUGMENTED REALITY

(71) Applicant: ATI Technologies ULC, Markham (CA)

(72) Inventors: Mikhail Mironov, Markham (CA); Gennadiy Kolesnik, Markham (CA); Pavel Siniavine, Markham (CA)

(73) Assignee: ATI Technologies ULC, Markham (CA)

( * ) Notice: Subject to any disclaimer, the term of this patent is extended or adjusted under 35 U.S.C. 154(b) by 0 days.

(21) Appl. No.: 16/719,354

(22) Filed: Dec. 18, 2019

(65) Prior Publication Data
US 2021/0192681 A1 Jun. 24, 2021

(51) Int. Cl.
*G06T 3/18* (2024.01)
*G06F 3/01* (2006.01)
*G06T 3/10* (2024.01)
*G06T 5/80* (2024.01)

(52) U.S. Cl.
CPC ............ *G06T 3/18* (2024.01); *G06F 3/011* (2013.01); *G06T 3/10* (2024.01); *G06T 5/80* (2024.01); *G06T 2207/10016* (2013.01)

(58) Field of Classification Search
CPC ..... G06T 3/0093; G06T 3/0056; G06T 5/006; G06T 2207/10016; G06T 3/18; G06T 3/10; G06T 5/80; G06F 3/011
See application file for complete search history.

(56) References Cited

U.S. PATENT DOCUMENTS

| | | | | |
|---|---|---|---|---|
| 6,181,343 B1* | 1/2001 | Lyons | ..................... | A63F 13/10 715/850 |
| 6,445,815 B1* | 9/2002 | Sato | ......................... | G06T 7/73 348/E13.016 |
| 8,373,802 B1* | 2/2013 | Gross | .................. | G11B 27/034 348/700 |
| 8,717,390 B2* | 5/2014 | Gross | ........................ | G06T 3/04 345/660 |
| 8,988,422 B1* | 3/2015 | Hodgins | ................. | G06T 13/40 345/475 |
| 9,332,285 B1* | 5/2016 | Grant | ............... | H04N 21/23439 |
| 9,588,593 B2* | 3/2017 | Li | .......................... | G06T 19/20 |
| 9,588,598 B2* | 3/2017 | Li | ........................ | G02B 27/017 |
| 9,858,637 B1* | 1/2018 | Quach | .................. | G06T 19/006 |
| 10,026,212 B2* | 7/2018 | Donner | ............... | H04N 13/376 |
| 10,102,666 B2* | 10/2018 | Parker | ..................... | G06F 3/038 |
| 10,341,650 B2* | 7/2019 | Mammou | ............ | H04N 19/124 |
| 10,432,988 B2* | 10/2019 | Zhang | ................ | H04N 21/6582 |
| 10,446,119 B1* | 10/2019 | Lakshmikantha | ..... | G09G 3/003 |

(Continued)

*Primary Examiner* — Charles L Beard
(74) *Attorney, Agent, or Firm* — Volpe Koenig

(57) ABSTRACT

A client device for use in processing reality technology content is provided. The client device comprises memory configured to store data and a processor in communication with the memory. The processor is configured to receive, from a server device via network communication channel, a video stream comprising encoded video frames and motion vector information and extract, at the client device, the motion vector information. The processor is also configured to decode the video frames, determine whether to at least one of time warp the video frames and space warp the video frames using the extracted motion vector information. The processor is also configured to display the warped video frame data.

19 Claims, 4 Drawing Sheets

(56) References Cited

U.S. PATENT DOCUMENTS

| | | | | |
|---|---|---|---|---|
| 10,706,813 | B1* | 7/2020 | Fruchter | G06T 5/00 |
| 10,733,789 | B2* | 8/2020 | Croxford | G06T 7/20 |
| 10,741,147 | B1* | 8/2020 | Chen | G09G 5/363 |
| 10,762,598 | B2* | 9/2020 | Liebenow | G06T 3/0093 |
| 10,796,407 | B2* | 10/2020 | Goel | G06T 3/18 |
| 10,871,627 | B1* | 12/2020 | Fang | G02B 27/0093 |
| 10,880,587 | B2* | 12/2020 | Zhang | H04N 21/6582 |
| 10,884,493 | B2* | 1/2021 | Parshionikar | G06F 3/04842 |
| 11,012,677 | B1* | 5/2021 | Bleyer | H04N 13/296 |
| 11,016,560 | B1* | 5/2021 | Wenger | H04N 13/122 |
| 11,055,879 | B1* | 7/2021 | Strandborg | G06T 7/50 |
| 11,126,001 | B2* | 9/2021 | Otsuka | G02B 27/0172 |
| 11,127,221 | B1* | 9/2021 | Bastani | G02B 27/017 |
| 11,144,117 | B1* | 10/2021 | Choudhuri | G06N 20/00 |
| 11,544,822 | B2* | 1/2023 | Inada | G06T 15/04 |
| 2002/0021756 | A1* | 2/2002 | Jayant | H04N 19/152 375/E7.181 |
| 2002/0176506 | A1* | 11/2002 | Ferreira Florencio | H04N 21/4383 375/E7.218 |
| 2003/0026500 | A1* | 2/2003 | Hersch | B42D 25/29 382/302 |
| 2003/0208335 | A1* | 11/2003 | Unuma | A61B 5/6831 702/141 |
| 2004/0001146 | A1* | 1/2004 | Liu | G06V 40/161 348/207.99 |
| 2004/0075677 | A1* | 4/2004 | Loyall | G10L 13/033 715/706 |
| 2005/0180656 | A1* | 8/2005 | Liu | G06T 5/80 382/284 |
| 2006/0153287 | A1* | 7/2006 | Shen | H04N 19/159 375/240 |
| 2006/0262184 | A1* | 11/2006 | Peleg | G06T 3/16 348/36 |
| 2010/0165206 | A1* | 7/2010 | Nestares | G06T 5/70 348/607 |
| 2010/0298958 | A1* | 11/2010 | Connelly | A63B 71/06 473/451 |
| 2013/0073296 | A1* | 3/2013 | Bayer | G10L 19/022 704/500 |
| 2013/0159928 | A1* | 6/2013 | Joynes | A63F 13/2145 715/810 |
| 2014/0184496 | A1* | 7/2014 | Gribetz | G06F 3/0482 345/156 |
| 2015/0254813 | A1* | 9/2015 | Foi | H04N 5/33 382/275 |
| 2015/0316576 | A1* | 11/2015 | Pakzad | G01P 15/00 702/141 |
| 2015/0316577 | A1* | 11/2015 | Pakzad | G01P 15/00 702/150 |
| 2015/0316579 | A1* | 11/2015 | Pakzad | G01C 22/006 702/150 |
| 2016/0100107 | A1* | 4/2016 | Nakamura | H04N 5/77 348/77 |
| 2016/0272340 | A1* | 9/2016 | Leland | G02B 27/0103 |
| 2016/0294824 | A1* | 10/2016 | Sezille | H04L 63/0861 |
| 2016/0328882 | A1* | 11/2016 | Lee | G06T 19/006 |
| 2016/0364904 | A1* | 12/2016 | Parker | G06F 3/038 |
| 2017/0003750 | A1* | 1/2017 | Li | G06F 3/017 |
| 2017/0018121 | A1* | 1/2017 | Lawson | G06V 40/10 |
| 2017/0069107 | A1* | 3/2017 | Kobayashi | G06T 7/74 |
| 2017/0108922 | A1* | 4/2017 | Terahata | H04N 23/611 |
| 2017/0155885 | A1* | 6/2017 | Selstad | G06T 7/20 |
| 2017/0185171 | A1* | 6/2017 | Li | G02B 27/0172 |
| 2017/0192521 | A1* | 7/2017 | Jafari | G06F 3/017 |
| 2017/0199565 | A1* | 7/2017 | Dong | G06T 7/20 |
| 2017/0200092 | A1* | 7/2017 | Kisilev | G06N 3/08 |
| 2017/0228015 | A1* | 8/2017 | Russell | G06F 3/012 |
| 2017/0228855 | A1* | 8/2017 | Bates | G06F 3/011 |
| 2017/0237964 | A1* | 8/2017 | Mäenpää | H04N 13/366 348/39 |
| 2017/0243324 | A1* | 8/2017 | Mierle | G06T 15/005 |
| 2017/0272668 | A1* | 9/2017 | Ribardo, Jr. | H04N 25/531 |
| 2017/0287097 | A1* | 10/2017 | Chen | G06T 19/006 |
| 2017/0302918 | A1* | 10/2017 | Mammou | H04N 19/103 |
| 2017/0302972 | A1* | 10/2017 | Zhang | H04N 21/2343 |
| 2017/0309071 | A1* | 10/2017 | Benko | G06T 19/006 |
| 2017/0310901 | A1* | 10/2017 | Sheikh | G06T 3/18 |
| 2017/0332018 | A1* | 11/2017 | Bell | H04N 23/689 |
| 2017/0345220 | A1* | 11/2017 | Bates | H04N 13/383 |
| 2017/0374341 | A1* | 12/2017 | Michail | G06T 19/00 |
| 2018/0047332 | A1* | 2/2018 | Kuwahara | G09G 3/2096 |
| 2018/0061121 | A1* | 3/2018 | Yeoh | G06T 1/60 |
| 2018/0075653 | A1* | 3/2018 | Schillings | A63B 71/0622 |
| 2018/0075654 | A1* | 3/2018 | Vembar | G06T 7/70 |
| 2018/0075820 | A1* | 3/2018 | Hicks | G06F 3/14 |
| 2018/0081429 | A1* | 3/2018 | Akenine-Moller | G06F 3/013 |
| 2018/0096518 | A1* | 4/2018 | Mallinson | G06F 3/012 |
| 2018/0108110 | A1* | 4/2018 | Cuervo | G06T 15/20 |
| 2018/0146189 | A1* | 5/2018 | Park | H04N 13/344 |
| 2018/0165878 | A1* | 6/2018 | Khan | G06T 3/18 |
| 2018/0197551 | A1* | 7/2018 | Mcdowell | H04S 7/30 |
| 2018/0220119 | A1* | 8/2018 | Horvitz | H04N 21/234363 |
| 2018/0232050 | A1* | 8/2018 | Ofek | G06T 3/18 |
| 2018/0268806 | A1* | 9/2018 | Chun | G10L 13/027 |
| 2018/0286101 | A1* | 10/2018 | Tanner | H04N 19/17 |
| 2018/0286105 | A1* | 10/2018 | Surti | H04N 23/67 |
| 2018/0293786 | A1* | 10/2018 | Insko | H04N 13/279 |
| 2018/0300932 | A1* | 10/2018 | Kuwahara | G06T 15/005 |
| 2018/0300934 | A1* | 10/2018 | Kuwahara | G06F 9/5027 |
| 2018/0307042 | A1* | 10/2018 | Riguer | G09G 3/002 |
| 2018/0307303 | A1* | 10/2018 | Powderly | G06T 19/006 |
| 2018/0309927 | A1* | 10/2018 | Tanner | H04N 21/816 |
| 2018/0336659 | A1* | 11/2018 | Tavakoli | G06T 1/60 |
| 2018/0350032 | A1* | 12/2018 | Bastani | G06T 15/20 |
| 2018/0357809 | A1* | 12/2018 | Lawless | G06T 3/18 |
| 2018/0364810 | A1* | 12/2018 | Parshionikar | G06F 3/013 |
| 2018/0365882 | A1* | 12/2018 | Croxford | G06T 7/20 |
| 2019/0012826 | A1* | 1/2019 | Melkote Krishnaprasad | G06F 3/013 |
| 2019/0033961 | A1* | 1/2019 | Croxford | A63F 13/212 |
| 2019/0037240 | A1* | 1/2019 | Schmit | H04N 19/57 |
| 2019/0037244 | A1* | 1/2019 | Melkote Krishnaprasad | H04N 19/105 |
| 2019/0056592 | A1* | 2/2019 | Fenney | H04N 9/3173 |
| 2019/0102859 | A1* | 4/2019 | Hux | G06T 1/20 |
| 2019/0102865 | A1* | 4/2019 | Hensley | G06T 15/005 |
| 2019/0146313 | A1* | 5/2019 | De La Cruz | G03B 21/142 345/581 |
| 2019/0156545 | A1* | 5/2019 | Horn | G06F 3/04845 |
| 2019/0166339 | A1* | 5/2019 | De La Cruz | G06T 5/80 |
| 2019/0180494 | A1* | 6/2019 | Kuwahara | G06F 9/5027 |
| 2019/0196940 | A1* | 6/2019 | Psiaki | G06F 3/011 |
| 2019/0197663 | A1* | 6/2019 | Jin | G06T 1/20 |
| 2019/0244582 | A1* | 8/2019 | Fruchter | G06T 19/006 |
| 2019/0310818 | A1* | 10/2019 | Liu | G06T 7/001 |
| 2019/0317595 | A1* | 10/2019 | Nakata | G06F 3/012 |
| 2019/0333263 | A1* | 10/2019 | Melkote Krishnaprasad | G06F 3/012 |
| 2019/0340812 | A1* | 11/2019 | Fuetterling | G06T 9/00 |
| 2019/0361518 | A1* | 11/2019 | Vakrat | G06F 3/012 |
| 2019/0371279 | A1* | 12/2019 | Mak | G09G 5/14 |
| 2019/0379819 | A1* | 12/2019 | Shimada | G06V 40/23 |
| 2020/0013184 | A1* | 1/2020 | Linde | G06T 7/73 |
| 2020/0027275 | A1* | 1/2020 | Wan | G06V 10/82 |
| 2020/0037043 | A1* | 1/2020 | Phillips | H04N 21/23418 |
| 2020/0043223 | A1* | 2/2020 | Leiby | G06F 3/011 |
| 2020/0045288 | A1* | 2/2020 | Boyce | H04N 13/167 |
| 2020/0050264 | A1* | 2/2020 | Kruzel | G06T 11/00 |
| 2020/0058152 | A1* | 2/2020 | Zhang | H04W 76/10 |
| 2020/0098186 | A1* | 3/2020 | Xue | H04N 21/6587 |
| 2020/0104975 | A1* | 4/2020 | Banerjee | A63F 13/428 |
| 2020/0111195 | A1* | 4/2020 | Vlachos | G06F 3/013 |
| 2020/0118669 | A1* | 4/2020 | Mohr | G16H 50/20 |
| 2020/0151102 | A1* | 5/2020 | Mah | G06F 12/0864 |
| 2020/0151939 | A1* | 5/2020 | Mah | A63F 13/355 |
| 2020/0167999 | A1* | 5/2020 | Schmit | G06F 3/013 |
| 2020/0168001 | A1* | 5/2020 | Yang | G06T 15/005 |
| 2020/0225473 | A1* | 7/2020 | Selan | G02B 27/0172 |
| 2020/0234401 | A1* | 7/2020 | Ollila | G06T 3/18 |
| 2020/0234408 | A1* | 7/2020 | Melakari | G06T 3/4053 |
| 2020/0249752 | A1* | 8/2020 | Parshionikar | G06F 1/163 |

(56) References Cited

U.S. PATENT DOCUMENTS

| | | | | |
|---|---|---|---|---|
| 2020/0279432 | A1* | 9/2020 | Yeoh | G09G 5/363 |
| 2020/0285053 | A1* | 9/2020 | Tan | G02B 27/0093 |
| 2020/0288164 | A1* | 9/2020 | Lin | H04N 21/234345 |
| 2020/0311439 | A1* | 10/2020 | Mansour | G06T 7/262 |
| 2020/0319463 | A1* | 10/2020 | Nakamura | H04N 21/4318 |
| 2020/0341284 | A1* | 10/2020 | Ichikawa | G02B 27/0093 |
| 2020/0348750 | A1* | 11/2020 | Selan | G09G 3/3426 |
| 2020/0364901 | A1* | 11/2020 | Choudhuri | G06T 19/006 |
| 2020/0382755 | A1* | 12/2020 | DiVerdi | H04N 23/698 |
| 2020/0410638 | A1* | 12/2020 | Yun | G06T 7/90 |
| 2020/0410740 | A1* | 12/2020 | Croxford | G06T 7/251 |
| 2021/0014539 | A1* | 1/2021 | Gao | H04N 21/41407 |
| 2021/0037250 | A1* | 2/2021 | Makar | H04N 19/174 |
| 2021/0042985 | A1* | 2/2021 | Melkote Krishnaprasad | G06T 7/73 |
| 2021/0055545 | A1* | 2/2021 | Rodgers | G06N 3/04 |
| 2021/0056761 | A1* | 2/2021 | Nigam | G06F 21/44 |
| 2021/0073997 | A1* | 3/2021 | Vora | G06V 20/49 |
| 2021/0136397 | A1* | 5/2021 | Lakshmikantha | H04L 43/08 |
| 2021/0142145 | A1* | 5/2021 | Bastani | G06F 3/0346 |
| 2021/0142443 | A1* | 5/2021 | Eble | H04N 19/119 |
| 2021/0150666 | A1* | 5/2021 | Dolgin | G06T 5/70 |
| 2021/0185294 | A1* | 6/2021 | Malaika | G06T 7/73 |
| 2021/0185334 | A1* | 6/2021 | Mironov | H04N 19/436 |
| 2021/0240258 | A1* | 8/2021 | Son | G02B 27/017 |
| 2021/0258555 | A1* | 8/2021 | Leiby | H04N 13/344 |
| 2021/0281867 | A1* | 9/2021 | Golinski | G06N 3/045 |
| 2021/0312694 | A1* | 10/2021 | Zhang | G02B 27/0093 |
| 2021/0334934 | A1* | 10/2021 | Liu | G06T 3/4007 |
| 2021/0366334 | A1* | 11/2021 | Russell | G09G 3/02 |
| 2021/0377515 | A1* | 12/2021 | Aga | H04N 13/344 |
| 2022/0076389 | A1* | 3/2022 | Inada | G06T 3/18 |
| 2022/0091663 | A1* | 3/2022 | Hashimoto | G06T 11/60 |
| 2022/0095149 | A1* | 3/2022 | Mironov | H04W 28/06 |
| 2022/0095313 | A1* | 3/2022 | Kim | H04W 72/23 |
| 2022/0101487 | A1* | 3/2022 | Akiba | G06T 5/50 |
| 2022/0198627 | A1* | 6/2022 | Rao Padebettu | G06T 5/80 |
| 2022/0201271 | A1* | 6/2022 | Bastani | G06T 11/00 |
| 2022/0230327 | A1* | 7/2022 | Croxford | G06T 1/20 |
| 2022/0253966 | A1* | 8/2022 | Croxford | G06T 1/20 |
| 2022/0291742 | A1* | 9/2022 | Otsuka | G09G 5/36 |
| 2022/0319105 | A1* | 10/2022 | Ohashi | G06F 3/011 |
| 2022/0351461 | A1* | 11/2022 | Peuhkurinen | G06T 1/20 |
| 2022/0375028 | A1* | 11/2022 | Jung | G06F 3/147 |
| 2023/0128288 | A1* | 4/2023 | Lansel | G09G 3/003 345/629 |
| 2023/0136662 | A1* | 5/2023 | Keeler | G06T 7/70 345/647 |
| 2023/0199145 | A1* | 6/2023 | Weng | H04N 7/0125 348/441 |
| 2023/0260191 | A1* | 8/2023 | Mihály | G06F 3/011 345/419 |

* cited by examiner

FRAME REPROJECTION FOR VIRTUAL REALITY AND AUGMENTED REALITY

BACKGROUND

Reality technologies, such as virtual reality (VR) and augmented reality (AR) both have the ability to alter our perception of the world. VR seeks to provide a realistic visual experience to immerse users in simulated environments and artificially create sensory experiences of the users. AR provides an enhanced version of reality by augmenting a user's view of the real world with computer-generated content, such as superimposed digital images.

BRIEF DESCRIPTION OF THE DRAWINGS

A more detailed understanding can be had from the following description, given by way of example in conjunction with the accompanying drawings wherein.

DETAILED DESCRIPTION

Figure 1:
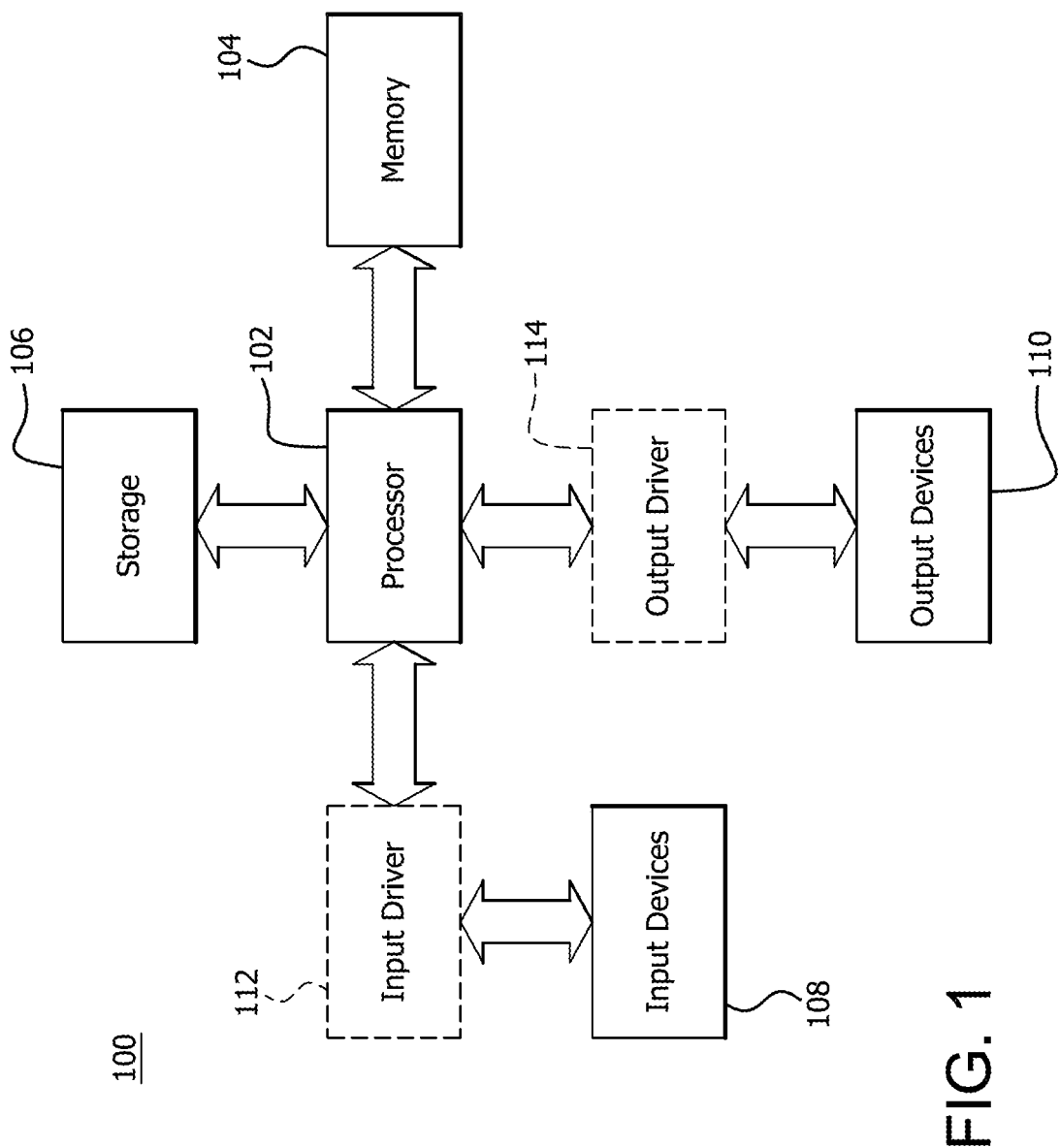
FIG. 1 is a block diagram of an example device in which one or more features of the disclosure can be implemented.

Some conventional reality technology systems, such as VR systems, include a head mounted display (HMD) at a client device for displaying video content to a user. The video content, which is rendered, via an application, at a server device (e.g., PC, home server or game console), is encoded and sent, via a wireless network communication channel (e.g., WiFi, Bluetooth) or wired network communication channel (e.g., HDMI, Ethernet) to the HMD which decodes the video and presents the video for display. Movements of the HMD are tracked so that the video frames are rendered to correspond to the changing images displayed to the user resulting from the user's head movements.

In the real world, objects are observed instantaneously. When a person moves his or her head, objects in the person's changed field of view are also observed instantaneously (or at least perceived to be observed instantaneously). That is, the time period, from a time of a person's head movement to a time that objects in the changed field of view are observed, is perceived by the person to be zero. Accordingly, the visual experience of reality technology systems is made more realistic by displaying what users expect to see, in real time, throughout their experience. To facilitate this more realistic experience, the video data to be displayed is processed with high visual quality (e.g., rendering the video data at a high frame rate, such as, for example, at least 60 frames per second) and with low latency.

Frames which arrive at the client device late for presentation cause gaps (e.g., missing frames) in the video stream which negatively affects the realistic experience. Two different types of lateness occur which negatively affects the realistic experience. A first type of lateness occurs when frames do not arrive at regular intervals (i.e., frame rate intervals). For example, because rendering times of the frames vary due to the nature of the video content, frames can arrive for presentation later than when the frames should have arrived according to the current frame rate (e.g., 90 frames per second).

A second type of lateness, which is prevalent in wireless reality technology systems, occurs when a frame arrives for presentation for display later than the frame should have arrived since the time the person moved his/her head to view the data in the frame. This type of lateness occurs regardless of whether or not the frames arrive at regular intervals.

Conventional reality technology systems use reprojection to fill the gaps in the video and maintain immersion (e.g., maintain the illusion that the user is in the immersive world) by analyzing previous frames and extrapolating data to synthesize the missing frames in the video to be displayed. For example, one reprojection technique, known as time warp reprojection, shifts the user's field of view (FOV) using acquired tracking data (e.g., data corresponding to a user's head motion) while still displaying the previous frame, providing the illusion of smooth movement of the video responsive to the user's head movements. For example, video frames are rendered (e.g., via a server engine) and encoded, via an encoder (e.g., a H.264 encoder, a HEVC encoder or any other encoder providing a compression ratio and quality sufficient for encoding video in reality technology systems) at the server device. The client device receives the encoded video data, via a wired (e.g., Ethernet, fiber optics, cable, and the like) or a wireless network (e.g., via WiFi, Bluetooth, 5G cellular and other wireless standards) or combination of wired and wireless networks, and decodes the video to be displayed. Prior to displaying the video at the client device, time warp reprojection is performed to synthesize the missing frames in the video to be displayed.

Time warp reprojection works reasonably well for static scenes, but does not compensate for dynamic scenes containing animation. In addition, while time warp reprojection works well for rotational head movements, wireless reality technology systems are also more susceptible to image judder occurring during linear head movements (e.g., forward, backward, sideways) of the user because time warp reprojection does not compensate for linear head movements which involve image scaling and distortion. For example, when a user moves forward through a static virtual scene, the motion vectors which are calculated from the differences between previous and current frames point outward from the center of the frame, effectively causing the image to be zoomed-in. Conversely, when a user moves backward, the motion vectors are determined to point inward toward the center of the frame and cause the image to be zoomed-out.

Some conventional reality technology systems perform space warping, in addition to time warping, to synthesize the reprojected frames which fill in the gaps of the video stream. For example, space warping uses hardware-accelerated motion estimators to generate a two-dimensional array of motion vectors that are calculated from differences between previous and current frames. These motion vectors provide information used to predict future positions of moving objects and synthesize the reprojected frames that fill the gaps between fully rendered frames. The extrapolated motion vector information can be used to synthesize the missing frames to fill the gaps resulting from frames not arriving at regular intervals.

The extrapolated motion vector information can also be used for frames which arrive late relative to the time of the head movement. For example, a frame is typically rendered several milliseconds before a time that the frame timely arrives for being provided for display at the client device.

The extrapolated data can be used to move objects to locations where they should be located in the current frame.

Smart client devices used in conventional reality technology systems are low-powered devices incapable of doing complex image processing, such as extracting motion vectors from frames of the video stream. That is, while these smart client devices possess some processing capabilities, they lack the processing capability and performance found in server devices (e.g., PC) to generate motion vectors. Accordingly, these conventional smart client devices are incapable of generating motion vector information to perform space warping and provide the image scaling and distortion to compensate for linear head movements or compensate for dynamic scenes containing animation.

The present application provides reality technology systems and methods which perform space warping and time warping reprojection on a low-powered smart client device by extracting and utilizing motion vector information present in the encoded video stream, encoded by the encoder at the server device to extrapolate and synthesize the reprojected frames. The low-powered processor in the client device utilizes the motion vectors, generated at the server device, to synthesize missing frames by shifting certain areas of the previous frame in the direction of motion vectors. That is, motion vector information is extracted at the client device from motion vectors generated at the server device (e.g., at video encoders at the server device). The extrapolated motion vector information is stored at the client device, and returned (e.g., to a client engine) for displaying the video data. The motion vector information extracted by the client device contains information similar to the motion vector information generated by the encoder at the server device in wired systems which is used to synthesize reprojected frames. Accordingly, the motion vector information generated by the decoder can similarly be used to space warp the video data on the low-powered client device.

The motion vectors are extracted from the video stream, at the client device, via software or hardware (e.g., by adding a function to the hardware decoder), to output the motion vectors together with the decoded frame. The motion vectors are used to scale and distort the image to compensate for a person's linear movements. For example, lateral movements cause motion vectors to point in the direction opposite to the direction of head movement. The modulus of a motion vector is proportional to the user's velocity, regardless of the direction of movement. Accordingly, the motion vector information is used to synthesize frames which accurately reflect the user's motion in any direction.

When motion vectors are not available in the current frame being decoded (e.g., I-frame or intra-refresh block), the motion vectors are extrapolated from previous frames by either the server device or the client device.

In one example, a scene change detector is used to detect a new scene. In this case, motion vectors from a first frame of the new scene are not used synthesize reprojected frames.

Space warping of the frames can be temporarily disabled for some detected events, such as frames rendered during rapid rotational head movements because of the inability of the human eye to perceive details during rotational head movements. Accordingly, if movements in any direction are detected which exceed a predetermined velocity, the space warping of the frames are temporarily disabled.

The present application provides a client device for use in processing reality technology content. The client device comprises memory configured to store data and a client processor in communication with the memory. The client processor is configured to receive, from a server device via a network communication channel, a video stream comprising encoded video frames and motion vector information and extract, at the client device, the motion vector information. The client processor is also configured to decode the video frames and determine whether to at least one of time warp the video frames and space warp the video frames using the extracted motion vector information. The processor is also configured to display the warped video frames.

The present application provides a method of processing reality technology content at a client device. The method comprises receiving, from a server device via a network, a video stream comprising encoded video frames and motion vector information; and extracting, at the client device, motion vector information. The method also comprises decoding the video frames and determining whether to at least one of time warp the video frames and space warp the video frames using the extracted motion vector information. The method also comprises displaying the warped video frame data.

The present application provides a non-transitory computer readable medium comprising instructions for causing a computer to execute a method of processing reality technology content at a client device which comprises receiving, from a server device via a network, a video stream comprising encoded video frames and motion vector information and extracting, at the client device, motion vector information. The method also includes decoding the video frames and determining whether to at least one of time warp the video frames and space warp the video frames using the extracted motion vector information. The method also comprises displaying the warped video frame data.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes one or more processors, such as a central processing unit (CPU), a graphics processing unit (GPU), or another type of compute accelerator, a CPU and GPU located on the same die, or one or more processor cores, wherein each processor core can be a CPU or a GPU or another type of accelerator. Multiple processors are, for example, included on a single board or multiple boards. Processor on one or more boards. In various alternatives, the memory 104 is be located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, one or more image capture devices (e.g., cameras), a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, one or more serial digital interface (SDI) cards, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The input driver 112 and the output driver 114 include, for example, one or more video capture devices, such as a video capture card (e.g., an SDI card). As shown in FIG. 1, the input driver 112 and the output driver 114 are separate driver devices. Alternatively, the input driver 112 and the output driver 114 are integrated as a single device (e.g., an SDI card), which receives captured image data and provides processed image data (e.g., panoramic stitched image data) that is stored (e.g., in storage 106), displayed (e.g., via display device 118) or transmitted (e.g., via a wireless network).

It is noted that the input driver 112 and the output driver 114 are optional components, and that the device 100 will operate in the same manner if the input driver 112 and the output driver 114 are not present. In an example, as shown in FIG. 1, the output driver 114 includes an accelerated processing device ("APD") 116 which is coupled to the display device 118. The APD is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2:
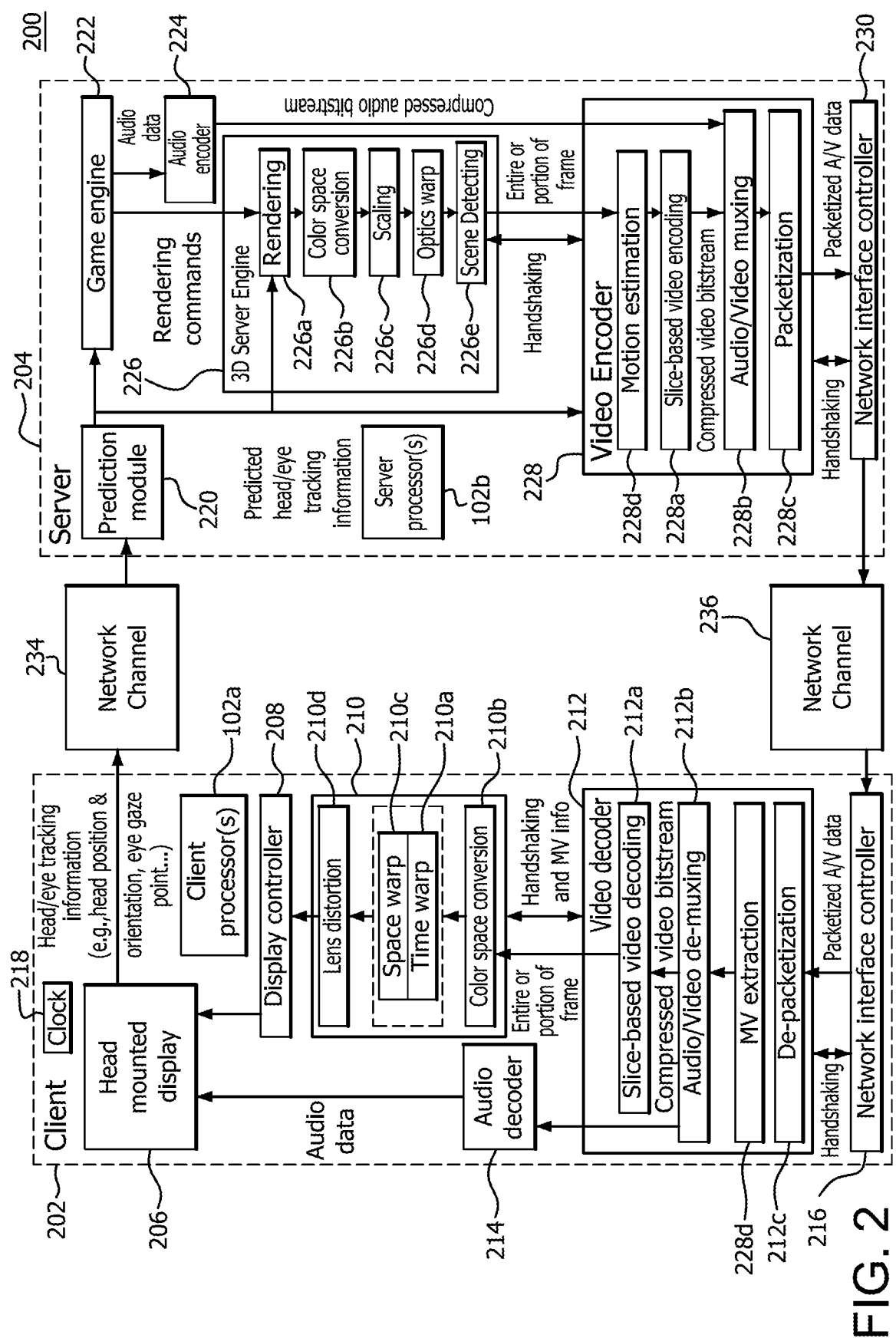
FIG. 2 is a block diagram illustrating an example interconnection and information flow in an example reality technology system.

FIG. 2 is a block diagram illustrating an interconnection and information flow in an example reality technology system 200 in which one or more features of the disclosure can be implemented. The reality technology system 200 is, for example, a system used for providing VR content and/or AR content. As shown in FIG. 2, the system 200 includes a client 202 and a server 204. The client 202 and the server 204 can each include one or more of the components shown in FIG. 1, such as for example, client processor(s) 102a, server processor(s) 102b, memory 104, storage 106, input devices 108, and output devices 110. Features of the disclosure can be implemented using each of the components shown in FIG. 2. Alternatively, features of the disclosure can be implemented without using one or more of the components shown in FIG. 2.

Some components, as described in more detail below, can perform tasks via hardware components, software components or a combination of hardware components and software components. Each of the client components can be part of a single device, such as for example a HMD device or a mobile device (e.g., smart phone running a mobile operating system (OS)). Components may also be part of separate devices. Each of the server components are, for example, a single device or alternatively, are part of separate devices.

Example components may implemented as part of, or used with, systems or devices capable of rendering video data, video encoding and transmitting 3D content, such as for example, PCs, home server, game consoles (e.g., XBOX consoles or PLAYSTATION consoles and the like).

Example components described herein may also be implemented as part of, or used with, systems or devices (e.g., a HMD) capable of displaying video data or interfacing with systems or devices, such as for example, smartphones, laptops, and the like.

Referring to FIG. 2, the client 202 is a low powered device and includes HMD 206, a display controller 208, a 3D client engine 210, a video decoder 212 which is configured to use motion vector estimation during a decoding process, an audio decoder 214 and a network device (e.g., receiver, transmitter, and transceiver, such as a client network interface controller (NIC) 216, for transmitting information and/or receiving information over one or more networks (e.g., local area network), including wired (e.g., Ethernet, fiber optics, cable, and the like) or wireless networks (e.g., via WiFi, Bluetooth, and other wireless standards). The client NIC 216 and server NIC 230 (described in more detail below) connect the client and the server (e.g., via dedicated channels 234 and 236) across for data (e.g., pose data) to be sent from the client 202 to the server 204 and rendered frames and other data to be sent from the server 204 (e.g., PC) to the client 202. The client 202 also includes one or more client processors 102a, in communication with memory, such as memory 104. Each of the client components shown in FIG. 2 are housed, for example, in a single device (e.g., device mounted to the head of a user) or alternatively, in separate devices.

The HMD 206 is, for example, removably mounted (e.g., via a helmet, goggles or other mounting device) on the head of a user (not shown). The HMD 206 includes, for example, a display (e.g., display monitor) configured to display images to a user (not shown). Examples of displays include liquid crystal displays (LCDs), electroluminescent displays, electrophoretic displays, field emission displays, light emitting diode (LED) displays, plasma displays, vacuum fluorescent displays (VFDs), and virtual retinal displays (VRDs).

The HMD 206 can be mounted in proximity to the user such that a portion of the display is aligned with a portion (e.g., eyes, portion of eyes (e.g., pupils)) of the user and the alignment is maintained or substantially maintained when the head (or other body parts) of the user moves during use. The HMD 206 can include audio providing components (e.g., headphones) configured to provide audio to the user. The audio providing components can also be separate from the HMD 206. The HMD 206 may include a separate monitor for each eye, or a single monitor for both eyes. Images may be superimposed on a real-world view, as part of an augmented reality or mixed reality display.

The HMD 206 includes, for example, one or more sensors (not shown) configured to sense tracking information, such as head or eye tracking information (e.g., head position, head orientation and eye gaze point). One or more of the sensors can also be separate from the HMD 206. The HMD 206 can also include a transmitter configured to transmit the sensed tracking information as feedback information to server 204 to predict a user viewpoint of a next frame of a sequence of frames of video data to be displayed. The client 202 can also include a transmitter separate from the HMD 206 configured to transmit the sensed tracking information as feedback information to server 204.

In the example shown in FIG. 2, the client 202 includes a system clock 218 to facilitate synchronization of the client 202 and the server 204. For example, the feedback information can include time stamp information indicating a time (e.g., point in time, time interval) via system clock 218 when the feedback information is sensed at the client 202. The time stamp can include a sequence of characters or encoded information. The time stamp may include a time code having a sequence of generated codes (e.g., numeric codes). The time stamp or time code can be generated at regular intervals, upon demand or upon the occurrence of an event. The clock 218 is, for example, separate from, or alternatively, part of the HMD 206. The clock 218 can be in communication with sensors and/or client processor(s) 102a to provide the time stamp for the sensed feedback information.

Alternatively, the client 202 and server 204 can run in independent clock domains. The feedback information can include time stamp information to uniquely identify which pose a certain frame was rendered with. The timestamp is attached to the frame, which is used by the client 202 to time warp the video frames, space warp the video frames or time warp and space warp the video frames. The timestamp described above is merely an example. Other examples for identifying a unique pose or the pose itself being sent along with the frame include a counter and a unique identifier.

Display controller 208 is configured to receive video signals from the 3D client engine 210 and display video to HMD 206 for display. Display controller 208 can comprise one or more of its own processors dedicated to receiving decoded video signals and providing the video signals for display and may also communicate with processor(s) 102a. Display controller 208 is configured to leverage the one or more processors 102a to provide the video signals for display.

The 3D client engine 210 includes, for example, a portion of software, having instructions and/or commands, which may execute on a processor or leverage multiple processors 102a, such as one or more CPUs and one or more GPUs. The 3D client engine 210 includes a time warp portion 210a, a color space conversion portion 210b a space warp portion 210c and a lens distortion portion 210d. The 3D client engine 210 is, for example, a portion of software that runs on or leverages one or more processors 102a, such as CPUs and GPUs. The 3D client engine 210 receives decoded information from decoder 212 and provides information to display controller 208. In some examples, the 3D client engine 210 is implemented as an engine capable of asynchronously executing graphics and compute functions.

The video decoder 212 and the audio decoder 214 decode A/V data received from network interface controller 216. The video decoder 212 and the audio decoder 214 can be implemented in hardware, software or a combination of hardware and software. A/V data can be decoded via software and hardware. The video decoder 212 can includes, for example, a slice-based video decoding portion 212a. Decoding can, however, be performed on any portion (e.g., rows of a frame, regions of a frame, blocks of a frame or a frame). The video decoder 212 also includes, for example, an A/V de-muxing portion 212b and a de-packetization portion 212c, each of which can be implemented in software or hardware. The de-muxing and de-packetization may minimize latency and the load on client processor(s) 102a (e.g., CPU).

The client NIC 216 is, for example, a device used to connect one or more client components (e.g., client processor(s) 102a, video decoder 212, and audio decoder 214) to one or more server components (e.g., server processor(s) 102a, video encoder 212, and audio encoder 224) via one or more wireless networks using network communication channel 236 dedicated to the A/V data and network communication channel 234 dedicated to the tracking information. Separate client NICs can also be used to communicate via the network communication channel 236 and the network communication channel 234. Client NICs can also be used to communicate the A/V data and tracking information over wired networks or a combination of wired and wireless networks.

In one example, the video decoder 212 is configured to extract motion vectors and use motion vector estimation in the decoding process of decoding the encoded video stream to synthesize reprojected video frames. Using a client application (e.g., client engine 210) running on the low powered client 202, one or more client processors 102a are configured to control the decoder 212 to de-packetize the compressed video stream at de-packetization block 212c and extract motion vector information and metadata (e.g., scene information) generated at the server 204. As described in more detail below, the one or more client processors 102a are configured to use the metadata to determine whether to extract the stored motion vector information for synthesizing the reprojected frames. Alternatively, when the video decoder 212 is not configured to extract motion vectors, the compressed video stream is pre-parsed to extract motion vector data (e.g., via fixed function hardware or software) before being submitted to the video decoder 212.

The one or more client processors 102a control the client engine 210 to perform time warping reprojection at block 210a, which includes shifting the user's FOV using acquired tracking data while still displaying the previous frame. The client processor(s) 102a controls the client engine 210 to time warp the video frames at block 210a and use the stored motion vector information generated by the video decoder 212 to space warp the video frames at block 210c to synthesize the reprojected frames.

The one or more client processors 102a provide the time warped and space warped video frames to the lens distortion portion 210d, which are then provided to display controller 208 for display. Lenses positioned close to the display inside HMD 206, optically magnify the image displayed. These lenses include, for example, regular converging lenses, Fresnel lenses, convex mirrors, etc. or a combination of multiple optical elements. The lenses often introduce various optical artifacts, such as for example, geometrical distortions and spherical and chromatic aberrations. Many of these artifacts can be compensated in software by distorting the image in such a way that the distortion that is introduced by the lens and added compensating distortion negate each other. For example, barrel distortion introduced by the lens can be negated by the pincushion distortion added to the image. Chromatic aberration can be eliminated by distorting the red, green and blue color components by a different amount so that the components converge after passing through the lens. Lens distortion compensation is typically performed as the final step before the image is displayed on the screen after other processing, such as time warp or space warp. Lens distortion compensation parameters are specific to the optical systems used in an HMD.

The one or more client processors 102a also controls the video decoder 212 and the client engine 210 to implement handshaking protocols with the 3D client engine 210 and client NIC 216. The video decoder 212 may interface with NIC 216 and receive the encoded A/V data via DMA.

Handshaking can be performed between client processor(s) 102a (e.g., CPU) and client NIC 216. For example, A/V de-muxing and de-packetization are performed separately from the video decoder 212, such as via software using one or more client processors 102a (e.g., CPU). Accordingly, handshaking can occur between the one or more client processors 102a (e.g., CPU) and client NIC 216 and without DMA.

As shown in FIG. 2, the server 204 includes a prediction module 220, a game engine 222, an audio encoder 224, a 3D server engine 226 and a video encoder 228. The server 204 also include a device (e.g., receiver, transmitter, and transceiver, such as server NIC 230, for transmitting information and/or receiving information over one or more networks (e.g., local area network), including wired (e.g., Ethernet) or wireless networks (e.g., via WiFi, Bluetooth, and other wireless standards). The server 204 may also include one or more server processor(s) 102b, which may include may include, for example, one or more CPUs and/or and one or more GPUs.

The prediction module 220 receives (e.g., via NIC 230 or a separate NIC dedicated to channel 234) the feedback information from client 202. The server 204 can also include a receiver, separate from the prediction module and in communication with other server components (e.g., prediction module 220, server one or more client processors 102b and game engine 222), that is configured to receive the feedback information from client 202. The prediction module 220 is configured in software, hardware or a combination of software and hardware to receive the feedback information from the client 202, such as the head and/or eye tracking information via communication channel 234 dedicated to the feedback information. The prediction module 220 provides prediction information (e.g., information indicating where the viewpoint of the user will be in the next frame) to the game engine 222 and the 3D engine 226. The prediction module 220 utilizes the time stamp information indicating a time when the tracking information is sensed at the client 202.

Game engine 222 includes a plurality of libraries, such as software development kits (SDKs). Games or simulations are developed on the game engine 222 to provide applications that include rendering instructions/commands to render (e.g., frame rendering) data as images for display. The applications run on a processor or leverage multiple processors 102b to provide the rendering instructions/commands to the 3D server engine 226 using the predicted information from prediction module 220. The game engine 222 may, for example, make different decisions on what data should be rendered, generate outputs (e.g., frames) based on collected user inputs, and run simulations to detect events, such as collisions. The game engine 222 is merely an example of an application used to implement features of the disclosure. Examples can include any graphical applications, other than game engines, which receive pose data and provide instructions for rendering an image.

The 3D server engine 226 executes the rendering instructions/commands, using one or more processors 102b, (e.g., CPUs and GPUs) to generate the next frame or portion of the next frame of video. In some implementations, the 3D server engine 226 is implemented as an engine capable of asynchronously executing graphics and compute functions. The 3D server engine 226 can use the prediction information from the prediction module 220 to generate the next frame or portion of the next frame of video. The 3D server engine 226 includes a rendering portion 226a, which renders the next frame or the portion (e.g., slice, block, macro block, and field) of the next frame. The 3D server engine 226 also includes a color space conversion portion 226b (e.g., to convert the next frame or the next frame portion represented one color space to another color space), a scaling portion 226c (e.g., to scale the next frame or the next frame portion) and an optics warp portion 226d (e.g., to correct image distortion).

The audio encoder 224 encodes audio data received from game engine 222. The audio encoder 224 may be implemented in hardware or software. Audio can be encoded via software encoding and hardware encoding.

The video encoder 228 is configured to receive prediction information from prediction module 220, audio data from audio encoder 224 and video data from 3D server engine 226 and provides encoded video data (either 3D or non-3D video) and/or audio data to the server NIC 230. The video encoder 228 includes a slice-based encoding portion 228a. Encoding can, however, be performed on any portion (e.g., rows of a frame, regions of a frame, blocks of a frame or a frame). The video encoder 228 also includes, for example, an A/V muxing portion 228b to provide A/V synchronization and a packetization portion 228c to format the video data into packets (e.g., IP packets) for transporting over a wireless or wired network communication channel. Different types of packets may be used according to different types of protocols. The video data may be sliced into smaller packets (e.g., packetized elementary stream (PES) packets) and then loaded into larger packets, such as IP packets. The multiplexing and packetization, which are performed using A/V muxing portion 228b and packetization portion 228c of video encoder 228, can minimize latency and the load on server processor(s) 102b (e.g., CPU).

The video encoder 228 includes a motion estimation portion, as shown at block 228d, to encode the rendered video frames. For example, the video encoder 228 calculates motion vectors (e.g., via hardware-accelerated motion estimators) from differences between previous and current frames. The motion vectors may be used at the client 202, to space warp the video frames and synthesize the reprojected frames. For example, as described in more detail below, based on various factors, such as for example, the type of motion (e.g., rotational vs linear), an amount of time elapsed since the last frame was received at the client 202 and the absolute values of the motion vectors, the client engine 210 may perform asynchronous time warp 210a without performing space warp 210c, perform space warp 210c (using the motion vector information) without performing time warp 210a or perform both time warp 210a and space warp 210c.

The video encoder 228 implements handshaking protocols with the 3D server engine 226 and server NIC 230, as described in more detail below. The video encoder 228 can also interface with NIC 230 and provide the encoded A/V data via DMA. Alternatively or additionally, handshaking is performed between server processor(s) 102b (e.g., CPU) and server NIC 230. For example, A/V multiplexing and packetization may be performed separate from the video encoder 228, such as via software using server processor(s) 102b (e.g., CPU). Accordingly, handshaking can occur between server processor(s) 102b (e.g., CPU) and server NIC 230 and without DMA.

The video encoder 228 is implemented, for example, in hardware, software or a combination of hardware and software. The video encoder 228 can include one or more processors dedicated to the video decoder 228. The video encoder 228 can also encode the data using or leveraging the one or more server processors 102b.

The server NIC 230 is, for example, a device used to connect one or more server components (e.g., server processor(s) 102b, video encoder 228, and audio encoder 224) to one or more other server components (e.g., server processor(s) 102b, video encoder 212, and audio encoder 224) via one or more wireless networks using communication channel 236 dedicated to the A/V data and communication channel 234 dedicated to the tracking information. Separate server NICs may also be used to communicate via the communication channel 236 and the communication channel 234. Server NICs can also be used to communicate the A/V data and tracking information over wired networks or a combination of wired and wireless networks.

The feedback information can be sent wirelessly from the client 202 to the server 204 via the network communication channel 234 dedicated to the feedback information 234 to provide a low latency path. Further, information, such as A/V information can be sent wirelessly from the server 204 to the client 202 via a wireless channel 236 dedicated to the A/V information to provide a low latency wireless medium. The feedback information and the A/V information can be wirelessly transmitted according to any of a variety of wireless protocols, such as for example, Wi-Fi (e.g., IEEE 802.11 protocols, such as 802.11ac, 802.11ad and the like), ZigBee (IEEE 802.15.4-2006), Radio Frequency for Consumer Electronics (RF4CE), 6LoWPAN, ONE-NET, Bluetooth, wireless USB, ANT and Infra-red Data Association (IrDA). Further, the client 202 and the server 204 can each include a wireless transmitter and receiver (not shown) for transmitting the feedback information and the A/V information according to a corresponding wireless protocol.

An example flow using the system 200 is now described using FIG. 2. For example, as shown in FIG. 2, the prediction module 220 receives the feedback information from the client 202, such as the head and/or eye tracking information via a communication channel 234 dedicated to the feedback information. The feedback information may include time stamp information indicating a time via system clock 218 when the feedback information is sensed at the client 202. The prediction module 220 makes predictions (e.g., where the viewpoint of the user will be in the next frame) based upon the feedback information and provides prediction information corresponding to the prediction to the game engine 222 and the 3D engine 226. The prediction module 220 may utilize the time stamp information to provide the prediction information. The prediction module 220 may also reside within the client device 202.

Game engine 222 receives the predicted information from prediction module 220 and provides rendering instructions/commands to the 3D server engine 226 to render video data. Game engine 222 also provides audio data to audio encoder 224.

The 3D server engine 226 receives the rendering commands from the game engine 222 and the prediction information from the prediction module 220 and generates data using the rendering commands and the prediction information. For example, the rendering portion 226a renders data (e.g., images, in stereoscopic view or non-stereoscopic view). As shown in FIG. 2, the color space conversion portion 226b performs color space conversion, the scaling portion 226c performs scaling of the video and the optics warp portion 226d performs image/optics warping to the video data. The 3D server engine 226 also performs scene detection at block 226e to determine whether or not the scene changes between frames. Color space conversion, scaling and image/optics warping and scene detection can be performed in any order, based on a plurality of factors including processing time, memory traffic and video quality.

In some examples, latency is reduced by encoding, transmitting (e.g., via a wireless network) and decoding the audio and video data by utilizing handshaking protocols between hardware components and/or software components (e.g., portions of code), such as for example, between (i) 3D server engine 226 and video encoder 228; (ii) video encoder 228 and server NIC 230; (iii) video decoder 212 and client NIC 216; and (iv) a 3D client engine 210 and video decoder 212.

For example the 3D server engine 226 stores the video data in one or more buffers (not shown), which may be implemented, for example as on-chip buffer and/or external buffers. The video encoder 228 reads the data stored by the 3D server engine 226 in the one or more buffers. The video encoder 228 performs handshaking with 3D server engine 226. For example, when one or more of the tasks (e.g., rendering of a portion of the next frame) is completed, the 3D server engine 226 may indicate to the video encoder 228 that the rendering is completed and the portion of the next frame is available for encoding to decrease latency between the video encoder 228 and the 3D server engine 226.

The handshaking is used, for example, to provide buffer management (e.g., prevent or limit underflow and overflow of the one or more buffers) and the input buffer rate or the output buffer rate is adjusted based on the handshaking. The handshaking is also used, for example, to efficiently synchronize the encoded video data with the encoded audio data at A/V muxing portion 228b.

In response to receiving the indication from the 3D server engine 226, the video encoder 228 encodes the portion of the next frame. During the encoding process, the video encoder 228 performs motion estimation 228d by calculating motion vectors from differences between previous and current frames. The video encoder 228 may encode the video on a per slice basis at portion 228a. The video encoder 228 can also encode different portions (e.g., one or more macro blocks) of the video bit stream at a time. The video encoder 228 synchronizes the audio and video data of the encoded slice and formats the encoded A/V data into IP packets.

The video encoder 228, for example, encodes the image in stereoscopic view and, during stereoscopic encoding, references the previous frame of the same view and the same frame of a different view for both frame sequential mode or left and right eye view. The video encoder 228 also, for example, encodes the image in non-stereoscopic view. Leveraging of proprietary time warp data received from the video encoder 228 of the client 202 can be implemented for encoding guidance.

The video encoder 228 interfaces via DMA with server NIC 230 and transfers the packetized data to the server NIC 230 without additional processor involvement to reduce latency. Each of the game engine 222, the audio encoder 224, the server 3D engine 226 and the video encoder 228 may run on or leverage one or more processors 102b, which includes, for example, CPU(s) and GPU(s) to perform any of the functions described herein.

The server NIC 230 transmits the A/V data across the network communication channel 236 to the client 202. The video data includes, for example, the compressed video frames, metadata (e.g., the scene detection information detected at block 226e) and the motion vector information calculated during the encoding process at block 228d. Alternatively, the motion vector information may be transmitted separately from the encoded video stream.

Client NIC 216 receives the encoded A/V data from the VR server 204. The client NIC 216 interfaces with the video decoder 212 and transfers the A/V IP packets via DMA to the video decoder 212 without additional CPU involvement. The video decoder 212 depacketizes the IP packets at portion 212c and de-muxes the A/V data at 212b. The audio decoder 214 interfaces with the client NIC 216, de-packetizes the IP packets and extracts and decodes the audio data. The compressed audio data is decoded by audio decoder 214 and the compressed video data is decoded (e.g., slice level video decoding) at portion 212a. IP packets and IP protocol is merely an example. Features of the present disclosure can be implemented using other types of communication protocols.

When it is determined (e.g., by client processor(s) 102a that scene change information in the video stream does not indicate a scene change (e.g., between the current and previous frame), the motion vector information is extracted from the video stream (or extracted separately when not part of the encoded video stream), stored and provided to the client engine 210 for space warping at block 210c. When it is determined (e.g., by client processor(s) 102a that scene change information in the video stream indicates a scene change (e.g., between the current and previous frame), the motion vector information is not extracted from the video stream and space warping is not performed at block 210c.

Using a client application (e.g., client engine 210) running on the low powered client 202, one or more client processors 102a are configured to control the decoder 212 to de-packetize the compressed video stream at de-packetization block 212c and extract motion vector information and metadata (e.g., scene information) generated at the server 204. Alternatively, when the video decoder 212 is not configured to extract motion vectors, the one or more client processors 102a are configured to pre-parse the compressed video stream to extract motion vector data (e.g., via fixed function hardware or software) before being submitted to the video decoder 212.

As described in more detail below, based on the type of motion (e.g., rotational vs linear), an amount of time elapsed since the last frame was received at the client 202 and the absolute values of the motion vectors, the one or more client processors 102a control the client engine 210 to time warp the video frames at block 210a without space warping the video frames space warping the video frames at block 210c without time warping the video frames or both time warping the video frames at block 210a and space warping the video frames at block 210c. The one or more client processors 102a provide the time warped video frames, the spaced warped video frames or the time warped and space warped video frames to the display controller 208 for display.

For example, as described in more detail below, based on the type of motion (e.g., rotational vs linear), an amount of time elapsed since the last frame was received at the client 202 and the absolute values of the motion vectors, the client engine 210 may perform asynchronous time warp 210a without performing space warp 210c, perform space warp 210c (using the motion vector information) without performing time warp 210a or perform both time warp 210a and space warp 210c The 3D client engine 210 receives the decoded bit stream from the video decoder 212, which can include any number of portions of decoded video (e.g., a frame or a portion of the frame). The 3D client engine 210 performs, for example, handshaking with the video decoder 212 and performs real time and/or image warping (via time warp portion 210a) on the data decoded by the video decoder with the display controller 208 by fetching and running a display shader after a pre-determined number of slices is decoded.

The video decoder 212 performs handshaking with 3D client engine 210 to provide buffer management, efficiently synchronize the encoded video data with the encoded audio data at A/V de-muxing portion 212b and decrease latency between the video decoder 212 and the 3D client engine 210. For example, when a portion of the video frame or the entire video frame is decoded, the video decoder 212 may indicate to the 3D server engine 210 that the video data is decoded and the decoded video information is available to be fetched. In response to receiving the indication from the video decoder 212, the 3D client engine 210 runs a display shader at color space conversion portion 210b, performs time warping on the decoded video data at portion 210a and, when it is determined that space warp may be effective, e.g. when scene change information in the video stream does not indicate a scene change, the 3D client engine 210 performs space warping at portion 210c using the motion vector information extracted during the decoding process.

The display controller 208 receives the decoded video data from the 3D client engine 210 and provides video to the HMD 206 for display and the audio decoder provides the audio data to the HMD 206 for aural presentation. After a pre-determined amount of time, the display controller 208 also, for example, fetches and displays the data decoded by the video decoder 212 and image warped by the 3D client engine 210. The data is, for example, keyed into a hardware real time display shader framework. The pre-determined amount of time ranges, for example, from a time to decode a portion of a frame to a time to decode a frame. The amount of time can be determined by a number of factors, including the bitrate and resolution capabilities of the video encoder 228 and video decoder 212. For example, the display controller 208 presents frames on the display at regular intervals determined by the frame rate. Decoded video is submitted to the client 3D engine 210 along with motion vectors extracted from the video stream. Based on the next frame's arrival time relative to the time when the next frame should be presented, the display controller presents the latest frame obtained from video decoder 212 or a frame synthesized from one or more of previous frames by applying motion vectors to the frames and, additionally or alternatively, time warps the frames to correct for the change in pose captured and sent to the server 204 over the network channel 234.

Movements (e.g., head movements, eye movements) of the user, responsive to being provided the video data and audio data, may be sensed as feedback information (e.g., high frequency (e.g., 1 KHz+) tracking information) and sent back to the server 204 through the same or different channel to minimize the impact of the video/audio data transferred from the server 204. For example, head pose, hand/controller poses and events (e.g., button presses, finger movements, gestures, eye movements, and the like) are polled at least once per frame on the client 202 and are sent to the server 204 over the network channel 234 and submitted to the application 222 running on the server. Poses and events refer, for example, to a current time when the poses or events are being captured, or be predicted to occur at a time in the future based on the measured latency of the system.

Reality technology systems and methods described herein can also include texture space rendering. For example, a VR server 204 component (e.g., game engine) is configured to generate rendered frames describing a texture atlas and the VR client 202 is configured to generate stitched left/right views by rendering a scene, while using decoded frames as texture, providing an efficient rendering pass because the server 204 has already included the shading information in the texture atlas.

Figure 3:
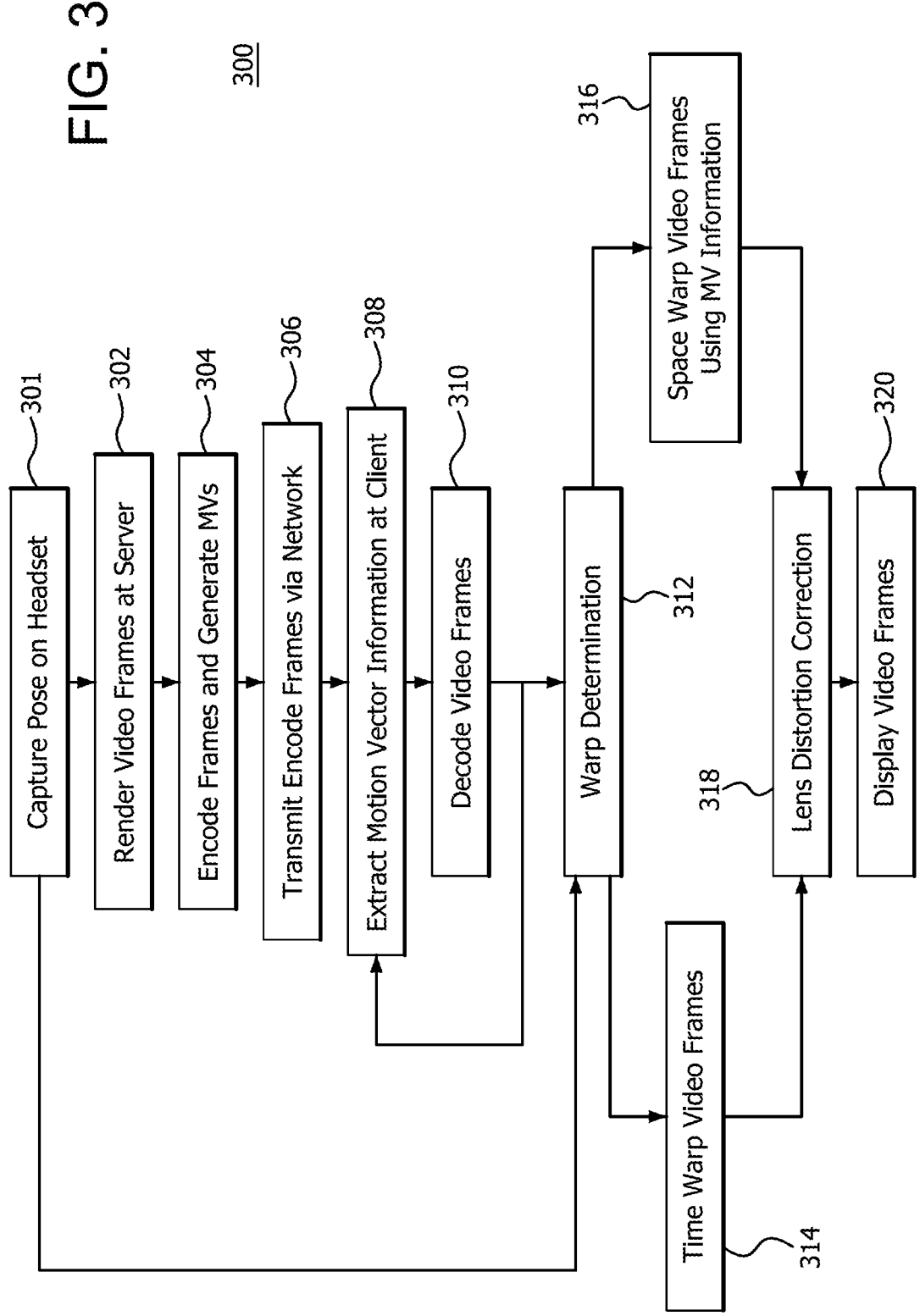
FIG. 3 is a flow diagram illustrating an example method of processing reality technology content according to features of the disclosure.

FIG. 3 is a flow diagram illustrating an example method of synthesizing reprojected video frames in a reality technology system.

At block 302, the method 300 includes rendering frames at a server device. For example, frames are rendered to correspond to the changing images displayed to a user resulting from the user's head movements viewing the images in a HMD. The frames are rendered, for example, at a server device, such as a PC or game console.

At block 304, the method 300 includes encoding frames and generating motion vectors. For example, motion vectors are calculated from differences between previous and current frames. The motion vectors provide information used to predict future positions of moving objects and synthesize reprojected frames that fill the gaps between rendered frames.

At block 306, the method 300 includes transmitting the encoded frames via a network communication channel. For example, the encoded video frames are formatted into packets and transmitted over a wireless or wired network communication channel.

At block 308, the method 300 includes extracting the motion vector information at a client device. For example, motion vector information is extracted, at the client device, from the video stream which includes the motion the vector information calculated at the server device and sent to the client device over the network communication channel.

At block 310, the method 300 includes decoding the video frames. The video frames are decoded, for example, according to H.264, HEVC or other video compressions standards.

At block 312, the method 300 includes performing a warp determination. That is, the method includes determining whether to time warp the video frames at block 314, space warp the video frames at block 316 or both time warp and space warp the video frames at blocks 314 and 316. The determination of how to warp the video frames is based on a number of factors, such as for example, scene change detection, the type of head motion (e.g., rotational vs linear), motion velocity, animation and an amount of time elapsed since the last frame was received.

At block 318 of method 300, any lens distortion is corrected after the reprojected frames are synthesized at block 314, block 316 or both blocks 314 and 316.

At block 320, the method 300 includes displaying the video frame data. That is, the synthesized reprojected video frames (e.g., time warped, space warped or time warped and space warped video data) which are distorted to compensate for the lens distortion are displayed to the user at the HMD.

Figure 4:
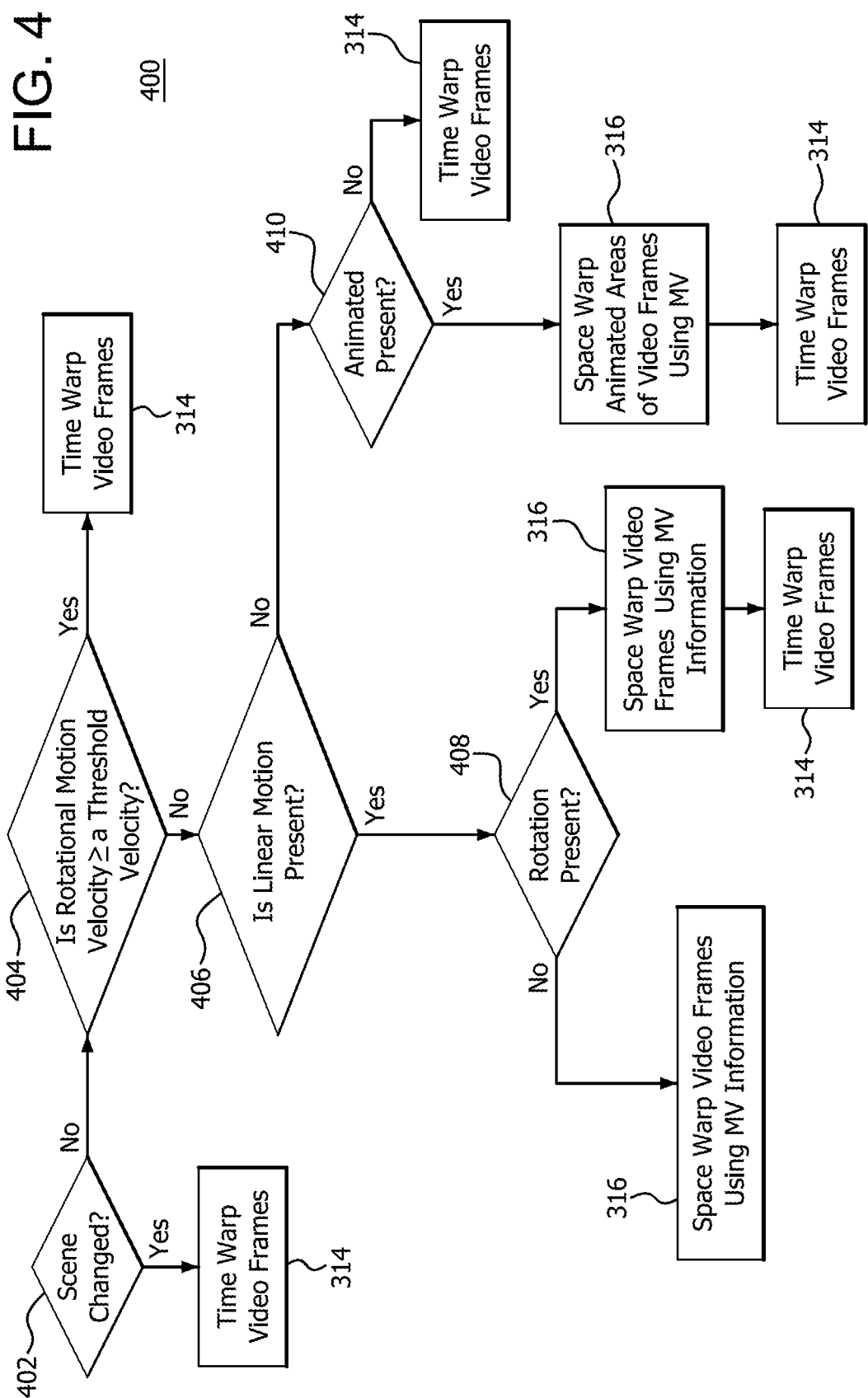
FIG. 4 is a flow diagram illustrating an example method of warp determination according to features of the disclosure.

FIG. 4 is a flow diagram illustrating an example method 400 of the warp determination at block 312 in FIG. 3. That is, FIG. 4 illustrates an example method for determining whether to time warp the video frames at block 314, space warp the video frames at block 316 or both time warp and space warp the video frames at blocks 314 and 316.

At decision block 402 of FIG. 4, the method 400 includes determining whether or not the encoded video stream includes a scene change. When it is determined that there is a scene change (i.e., a new scene), the motion vectors from a first frame of the new scene are not used for space warping and time warping is performed at block 314.

When it is determined that there is no scene change, the method 400 proceeds to decision block 404 to determine whether a rotational head motion velocity is greater than a threshold velocity. For example, tracking information (e.g., pose information) is received which indicates at least one of linear motion and rotational motion (including velocity) of a HMD corresponding to the linear and rotational motion of a head of a user to which the HMD is mounted.

When it is determined that the rotational head motion velocity is greater than or equal to a threshold rotational velocity, the frames are time warped at block 314. Motion vector-based space warping is not used because, for example, the user does not have enough time to observe the details in the frame or is not able to notice the small changes in the frame before the details change. When it is determined that the rotational head motion velocity is not greater than or equal to the threshold rotational velocity, the method 400 proceeds to decision block 406 to determine whether or not linear motion is present (e.g., whether or not an amount of linear motion is equal to or greater than a minimum linear motion threshold).

When linear motion is determined to be present (e.g., an amount of linear motion is determined to be equal to or greater than a minimum linear motion threshold), the method 400 proceeds to decision block 408 to determine whether or not rotational motion is present (e.g., whether or not the linear motion is equal to or greater than a minimum linear motion threshold). For example, rotational motion is determined to be present when an amount of rotational motion is equal to or greater than a minimum rotational motion threshold.

When it is determined at block 408 that rotational motion is present (e.g., an amount of rotational motion is equal to or greater than a minimum rotational motion threshold), the frames are space warped at block 316 using motion vector information and time warped at block 314. When it is determined at block 408 that rotational motion is not present (e.g., an amount of rotational motion is less than a minimum rotational motion threshold), the frames are space warped at block 316 using motion vector information.

Referring back to decision block 406, when it is determined that linear motion is not present (e.g., an amount of linear motion is less than a minimum linear motion threshold), the method 400 proceeds to decision block 410 to determine whether or not animation is present. When it is determined at block 410 that animation is present, animated areas identified in the frames are space warped at block 316 using motion vector information without space warping the non-animated areas in the frames and the frames are time warped at block 314. When it is determined at block 410 that animation is not present, however, the frames are time warped at block 314.

The determinations made at blocks 404, 406, 408 and 410 can be made based on the combination of analysis of motion vectors and sensor data (e.g., pose data captured on the headset). For example, when each motion vector is pointing in the same direction and each motion vector has the same modulus, either linear or rotational motion is indicated with no animation in the frame. Some motion vectors having a different modulus or pointing in different directions indicate the presence of animation. Motion vectors pointing outward from a single point indicate forward linear movement of the head, while motion vectors pointing inward and converging to a single point indicate backward linear motion. When each motion vector is pointing to the side, the motion vectors can be indicating either linear lateral movement, or rotational movement, or a combination of both. In this case, both motion vectors and sensor data are analyzed together (as indicated by the arrow from block 308 to block 312 and by the arrow from block 301 to block 312, respectively) to determine the true nature of the movement. It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the one or more client processors 102*a*, and the one or more server processors 102*b* may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A client device for use in processing reality technology content, the client device comprising:
    memory configured to store data; and
    a processor in communication with the memory and configured to:
    receive, from a server device via network communication channel, a video stream comprising encoded video frames and motion vector information,
    decode the encoded video frames to form decoded video frames,
    select a selected reprojection from a group of reprojections based on a comparison of a velocity of a rotational motion of a head mounted display to a threshold velocity and whether or not an animation is present in the decoded video frames, wherein the group of the reprojections comprises at least:
        time warping the decoded video frames,
        space warping the decoded video frames using the motion vector information, and
        time warping the decoded video frames and space warping the decoded video frames;
    form warped video frames by applying the selected reprojection to the decoded video frames, and
    display the warped video frames.

2. The client device according to claim 1, wherein the processor is further configured to distort the decoded video frames to compensate for lens distortion.

3. The client device according to claim 1, wherein the processor is further configured to:
    determine whether or not a scene change in the received video stream is detected;
    wherein the selected reprojection is further selected from the group of the reprojections based on whether or not the scene change in the received video stream is detected.

4. The client device according to claim 1, wherein the processor is further configured to:
    receive tracking information indicating linear motion of the head mounted display and the rotational motion of the head mounted display; and
    determine whether or not the velocity of the rotational motion is greater than or equal to the threshold velocity;
    wherein when the velocity of the rotational motion is determined to be greater than or equal to the threshold velocity, the time warping is selected as the selected reprojection.

5. The client device according to claim 1, wherein the processor is further configured to:
    determine whether linear motion is present,
    wherein the linear motion is determined to be present when the linear motion is equal to or greater than a minimum linear motion threshold, and
    the linear motion is determined not to be present when the linear motion is less than the minimum linear motion threshold,
    wherein the selected reprojection is further selected from the group of the reprojections based on whether or not the linear motion is present.

6. The client device according to claim 1, wherein the processor is further configured to:
    determine whether the velocity of the rotational motion is equal to or greater than a minimum rotational motion threshold;
    wherein when the velocity of the rotational motion is determined to be equal to or greater than the minimum rotational motion threshold and linear motion is present, the time warping is selected as the selected reprojection; and
    wherein when the velocity of the rotational motion is determined to be less than the minimum rotational motion threshold and the linear motion is present, the space warping is selected as the selected reprojection.

7. The client device according to claim 1, wherein:
    when the animation is determined to be present and linear motion is not present, the selected reprojection includes space warping animated areas of the decoded video frames using the motion vector information and time warping the decoded video frames.

8. The client device according to claim 1, wherein the processor is further configured to extract the motion vector information from the video stream.

9. The client device according to claim 1, wherein the processor is further configured to extract the motion vector information separate from the video stream.

10. A method of processing reality technology content at a client device, the method comprising:

receiving, from a server device via a network, a video stream comprising encoded video frames and motion vector information;

decoding the encoded video frames to form decoded video frames;

selecting selected reprojection from a group of reprojections based on a comparison of a velocity of a rotational motion of a head mounted display to a threshold velocity and whether or not an animation is present in the decoded video frames, wherein the group of the reprojections comprises at least:

time warping the decoded video frames, space warping the decoded video frames using the motion vector information, and time warping the decoded video frames and space warping the decoded video frames;

forming warped video frames by applying the selected reprojection to the decoded video frames; and displaying the warped video frames.

11. The method according to claim 10, further comprising distorting the decoded video frames to compensate for lens distortion.

12. The method according to claim 10, further comprising:

determining whether or not a scene change in the received video stream is detected;

wherein the selected reprojection is further selected from the group of the reprojections based on whether or not the scene change in the received video stream is detected.

13. The method according to claim 10, further comprising:

receiving tracking information indicating linear motion of the head mounted display and the rotational motion of the head mounted display;

determining whether or not the velocity of the rotational motion is greater than or equal to the threshold velocity;

wherein when the velocity of the rotational motion is determined to be greater than or equal to the threshold velocity, the time warping is selected as the selected reprojection.

14. The method according to claim 10, the method further comprising:

determining whether linear motion is present, wherein:

the linear motion is determined to be present when the linear motion is equal to or greater than a minimum linear motion threshold, the linear motion is determined not to be present when the linear motion is less than the minimum linear motion threshold, and the selected reprojection is further selected from the group of the reprojections based on whether or not the linear motion is present.

15. The method according to claim 10, further comprising:

determining whether the velocity of the rotational motion is equal to or greater than a minimum rotational motion threshold;

wherein when the velocity of the rotational motion is determined to be equal to or greater than the minimum rotational motion threshold and linear motion is present, the time warping is selected as the selected reprojection; and wherein when the velocity of the rotational motion is determined to be less than the minimum rotational motion threshold, the space warping is selected as the selected reprojection.

16. The method according to claim 10, wherein:

when the animation is determined to be present and linear motion is not present, the selected reprojection includes space warping animated areas of the encoded video frames using the motion vector information and time warping the decoded video frames.

17. The method according to claim 10, further comprising extracting the motion vector information from the video stream.

18. The method according to claim 10, further comprising extracting the motion vector information separate from the video stream.

19. A non-transitory computer readable medium comprising instructions for causing a computer to execute a method of processing reality technology content at a client device comprising:

receiving, from a server device via a network, a video stream comprising encoded video frames and motion vector information;

decoding the encoded video frames to form decoded video frames;

selecting selected reprojection from a group of reprojections based on a comparison of a velocity of a rotational motion of a head mounted display to a threshold velocity and whether or not an animation is present in the decoded video frames, wherein the group of the reprojections comprises at least:

time warping the decoded video frames, space warping the decoded video frames using the motion vector information, and time warping the decoded video frames and space warping the decoded video frames;

forming warped video frames by applying the selected reprojection to the decoded video frames; and displaying the warped video frames.

* * * * *